Figure 1:
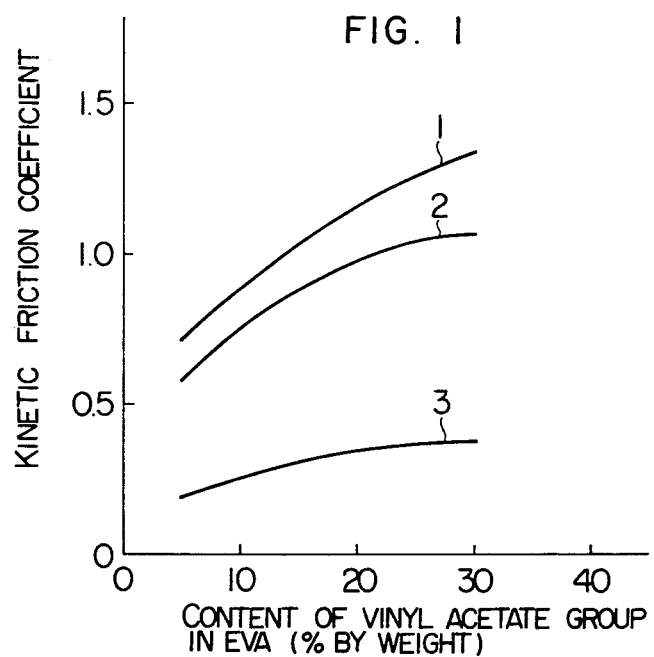

United States Patent [19]

Naito et al.

[11] 4,066,811
[45] Jan. 3, 1978

[54] ETHYLENE-VINYL ACETATE FILM SUITABLE FOR STRETCH WRAPPING

[75] Inventors: Hirokuni Naito, Hino; Isao Yoshimura, Fujisawa; Norito Takao, Yokohama; Yasuta Kawame, Kawasaki, all of Japan

[73] Assignee: Asahi-Dow Limited, Tokyo, Japan

[21] Appl. No.: 566,513

[22] Filed: Apr. 8, 1975

[30] Foreign Application Priority Data

Apr. 19, 1974 Japan ............................ 49-43284
Apr. 19, 1974 Japan ............................ 49-43285
May 1, 1974 Japan ............................ 49-48280

[51] Int. Cl.$^2$ .................. C08K 5/05; C08K 5/06; C08K 5/10; C08L 31/04
[52] U.S. Cl. .................. 428/220; 260/33.2 R; 260/33.4 R; 260/33.4 PQ; 426/415
[58] Field of Search ............ 260/33.2 R, 31.6, 33.4 R, 260/33.4 PQ; 106/13; 426/415; 428/220

[56] References Cited

U.S. PATENT DOCUMENTS 3,658,980  4/1972  Caiola et al. .................. 260/33.2 R

FOREIGN PATENT DOCUMENTS 2,117,386  6/1972  France .......................... 260/31.6

*Primary Examiner*—Allan Lieberman
*Attorney, Agent, or Firm*—Cushman, Darby & Cushman

[57] ABSTRACT

There are disclosed films for stretch wrapping which comprise an olefin polymer, preferably a specific ethylene-vinyl acetate copolymer (referred to as "EVA copolymer" hereinafter) and specific polyalkylene ether polyols and non-ionic surfactants of fatty acid and polyhydric alcohol ester derivatives and which have suitable orientation expressed by heat shrinkage and excellent elastic recovery, by which excellent mechanical strength, wrapping finish, optical characteristics and preservability of the goods, especially fresh foods are attained. Method for producing said films is also disclosed. These films are suitable also for wrapping by automatic wrapping machines.

14 Claims, 3 Drawing Figures

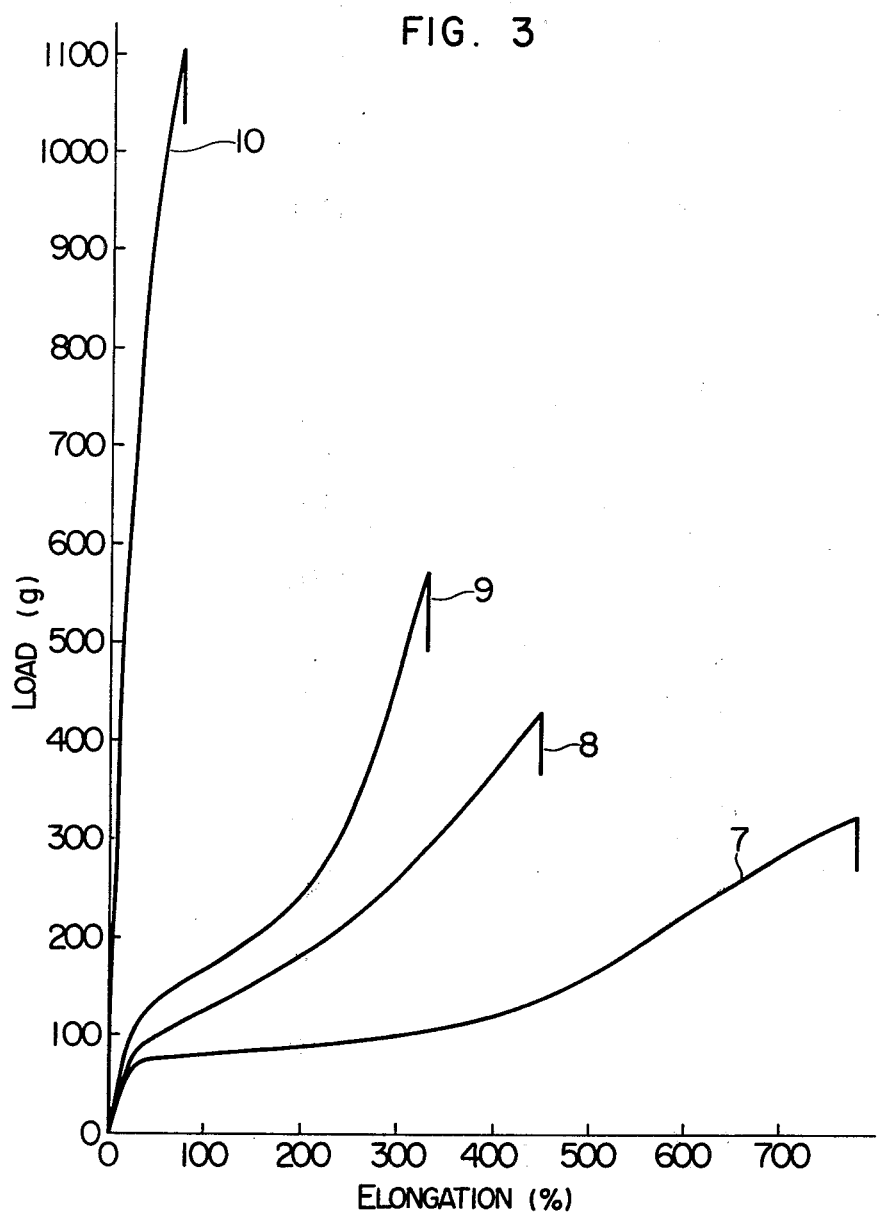

ETHYLENE-VINYL ACETATE FILM SUITABLE FOR STRETCH WRAPPING

There are various wrapping methods with films which utilize characteristics of the films such as the bag sealing method, twist wrapping method, shrink wrapping method, autohesive wrapping method, e.g., Saran wrap, stretch wrapping method and the like. These methods require respective wrapping characteristics and one must choose basic material, compositions, form and characteristics of the films suitable for the respective methods.

Among them, the stretch wrapping method requires the following properties of the film. That is, it leaves no permanent deformation and creases and fits the goods to be wrapped depending on the shape and size of irregularities of the goods when the film is stretched for wrapping; the film can be simply fixed by lightly pressing or heat setting the stretched film without loosening of the film due to being overcome by elasticity; the film should have appropriate gas permeability for wrapping of fresh foods to prevent reduction in freshness or loss of weight of foods; the film can cleanly preserve the goods and the quality of the goods can be confirmed by touch or eyesight through the film; the film should have excellent gloss and transparency, and can make the appearance of the goods beautiful and markedly increase the commercial value of the articles; the film can be used in both inexpensive hand wrapping machines and automatic wrapping machines as needed.

It is well known that the stretch wrapping method is a method having various excellent characteristics with use of the films as mentioned above and has been widely used for the wrapping of fruits and vegetables, perishable foods, raw meats, daily dishes, etc. in super markets.

Films to be used for stretch wrapping of, e.g., perishable foods are required to have the following characteristics.
a. They must be excellent in tackiness and cohesive properties.
b. They must have excellent deformation recovery and appropriate delayed response and elastic elongation.
c. They must have high mechanical strength (against break).
d. They must have appropriate slip properties.
e. They must be excellent in optical characteristics such as transparency and gloss.
f. They must have appropriate gas permeability.
g. They must not accumulate water droplets on the surface and must have antifog properties.
h. They must be sanitarily safe.
i. They must be excellent in wrapping operability.

Conventionally, only the films of soft vinyl chloride resin (referred to as "PVC" hereinafter) containing a large amount, e.g., more than 30% by weight of plasticizer have been industrially used for said wrapping method. However, it is difficult without incorporation of plasticizer in a large amount to produce these films and to impart softness and tackiness to them. As such plasticizers, for example, dioctyl phthalate and dibutyl phthalate are used and so such films have the following problems: the amount of water vapor which permeates therethrough is so great as to cause denaturation of the goods to be wrapped; the plasticizer moves to the goods to cause contamination of the goods; gas from the plasticizer and corrosive chlorine gas are generated when the film is cut by fusing at the wrapping operation; poisonous gas is generated when films after use are burned; the films are inferior in cold resistance and when they are used for preservation of the goods at low temperature, they become hard, form creases, become brittle and are easily broken. Moreover, under the condition of high temperature (e.g., 25° – 30° C) such as in summer, the plasticizer contained in the film abruptly bleeds out or the film become too soft and becomes sticky and it cannot smoothly wrap the goods by use of automatic wrapping machines.

Films made of high density polyethylene, low density polyethylene, polypropylene or mixtures thereof are excellent as compared with the PVC films, but have no other important properties required for the object of the present invention and it has been impossible to produce practical films for stretch wrapping which satisfy all of the above mentioned characteristics. For example, when non-oriented or low-oriented polypropylene film is stretched at the wrapping operation, only a certain part is elongated to cause conspicuous unevenness in thickness, namely, the necking phenomenon and after removal of the load permanent deformation remains to lose fittness to the goods and to greatly damage the appearance of the goods. Moreover, the above mentioned oriented films can be used for the shrink wrapping method, but since they are hard and low in elongation, a very large force is required for stretching and they tend to rupture the goods according to the present stretch wrapping method. Furthermore, they have no tackiness. The high density polyethylene films are also hard and in addition they are opaque and have no gloss. The high pressure process low density polyethylene films are softer than the above mentioned films, but they cause the necking phenomenon, have low deformation recovery and elastic elongation, have low strength, are inferior in optical characteristics and have no tackiness. Thus, these films cannot be used for the purpose of the present invention. Films sufficiently stretched and oriented have also said defects and also cannot be used for the purpose of the present invention.

Even when a plasticizer such as polybutene is added in an attempt to overcome said defects, tackiness cannot be imparted unless it is used in an amount of more than 5% by weight and even if the plasticizer is added, since these films have no ability of retaining the plasticizer like the PVC resin, excess plasticizer bleeds out from the surface and the films become sticky.

On the other hand, as the specific polymers having high strength and sufficient softness and excellent gloss and transparency among a great number of polyolefin polymers, there are EVA copolymer, crystalline ethylene-propylene random copolymer, crystalline 1,2 polybutadiene, etc. Especially, the EVA copolymer is known as having excellent softness and heat sealability and tackiness to a certain degree. However, no success has been attained in commercially producing the films for stretch wrapping, especially by using automatic wrapping machines. This is due to the problems in casting the EVA polymer into a thin film and in processing.

For example, when the resin is cast by the T-die method into a thin film, generally the resin must be extruded from the die at a high temperature to impart good optical characteristics thereto, but in this case cling occurs between the surface of the film and the surface of the take-up roll and blocking occurs between the surfaces of the taken-up film to make it difficult to release the films. Thus, homogeneous films cannot be efficiently obtained. Addition of the known additives such as an erucic amide antiblocking agent and slipping agent can overcome the problem of blocking at processing, but the surface of the film is stained and whitened and tackiness is lost. Furthermore, according to the T-die method, since the resin is extruded at a high temperature appropriate orientation cannot be applied and stretch cannot be set in the longitudinal and transverse directions in good balance. Therefore, strength of the film is low and said necking phenomenon occurs when the film is elongated to cause breakage of the film.

By the general inflation method which comprises extruding a resin from the annular die and blowing air into the film to produce a thin film, the extrusion must be carried out at a high temperature in order to obtain a thin film with high transparency and without roughening the surface. In this case, however, the film must be cooled to a temperature optimum for orientation (usually this temperature is much lower than the temperature at which the film is extruded from the die) and furthermore the film must be cooled to a temperature lower than the softening point to prevent blocking of the film and must be cooled by blowing sufficient air against the film because the inflated film must be folded. However, by such procedure the surface of the film is roughened and its optical characteristics are decreased. As the result, such film becomes unsuitable for the purpose of the present invention.

Furthermore, French Patent No. 2,117,386 discloses that for improving said defects of the EVA copolymer a suitable amount of an antiblocking agent and antifogging agent such as an ester of a polyhydric alcohol and a fatty acid and/or a polyalkylene oxide addition product of said ester are mixed with the EVA copolymer and then the mixture is inflated at one stage by the usual method or is cast on a cooling drum by the T-die method to obtain a film. However, as explained in the comparative examples given hereinafter, the compositions of the product and the method for producing the same in said French Patent No. 2,117,386 are different from the specific compositions and the specific method for producing the same of the present invention and moreover the product of said French Patent is not suitable for the purpose of the present invention.

Under the circumstances, the inventors have made intensive researchers in an attempt to obtain films having the properties most suitable for the uses intended in the present invention and have accomplished the present invention.

That is, the film of the present invention is a thin film which comprises a polyolefin polymer, especially an EVA copolymer having a melt index of 0.5 to 15 and containing 5 to 30% by weight of vinyl acetate groups as a basic component and (A) at least one polyalkylene ether polyol and (B) at least one non-ionic surfactant comprising a polyhydric alcohol ester derivative of a fatty acid and which has a kinetic coefficient of friction of 0.1 to 0.5, a tack strength of 0.4 to 1.5 Kg/cm$^2$, a haze of less than 5%, a heat shrinkage of 30 to 80% and an elastic recovery of higher than 60%.

The EVA copolymers especially preferred among the polyolefin polymers used as a basic component in the present invention are those having a melt index of 0.5 to 15 and containing 5 to 30% by weight of vinyl acetate groups. Said melt index is measured in accordance with ASTM-1238-65T. When the melt index is less than 0.5, the surface of the film is greatly roughened in processing to cause reduction in transparency and gloss and thus such film cannot be used for the purpose of the present invention. When the melt index is more than 15, the polymer is fluidized in processing into film and molding becomes difficult, namely, the so-called draw-down phenomenon occurs to make it difficult to produce a film. Even if it can be molded into a film, the resultant film is low in strength and when it is wound into a roll form, strong blocking occurs between the surfaces of the films and it becomes difficult to release the films.

The content of vinyl acetate groups is the value obtained by the elementary analysis method. When the content is less than 5% by weight, the copolymer has a high crystallinity and is low in softness and when processed into a film, this film has low transparency, is poor in gloss, is low in elastic recovery, tack strength and processing stability. When the content of vinyl acetate groups is more than 30% by weight, the copolymer is liable to draw down and is unstable upon processing into a film and the resultant film has low strength and strong blocking occurs between the surfaces of the film when wound into a roll form and the surfaces cannot be separated. Therefore, preferred ranges of the melt index and the content of vinyl acetate groups are 1 to 10 (more preferably 1 to 5) and 5 to 20% by weight, respectively. The properties of the EVA copolymer in the present invention are simultaneously influenced by the melt index which has a relation with the molecular weight and content of vinyl acetate groups which has a relation with the crystallinity and polar functional groups and so must satisfy both requirements. Furthermore, if necessary, other polymers which can be mixed with the EVA copolymer, plasticizers, coloring agents, etc. may be added as long as they do not damage the properties of the EVA copolymer.

Furthermore, crystalline polybutadiene having a crystallinity of higher than 10% obtained by X-ray analysis and a 1·2 bond structure of higher than 70% obtained by the infrared spectrum method, crystalline ethylene-propylene random copolymers having an ethylene content of 8 to 30% by weight, etc. may be employed as the basic component in the present invention. These polymers are preferred due to their high tackiness, elastcity, gloss, processability, etc. To use these polymers is important as one of the conditions for satisfying the elastic recovery of the film of the present invention mentioned hereinafter. However, not only the films comprising only such polymers and having a heat shrinkage of less than 30%, but also those which are oriented in such a manner that the heat shrinkage is more than 30% have a high kinetic coefficient of friction of the surface. Therefore, these films have no slip properties with the goods to be wrapped, the container and the wrapping machine, namely, the films are sticky. Furthermore, when they are wound into a roll form and stored at a high temperature for a long time, the blocking phenomenon occurs. In addition, they have no antifog property. Thus, such films are not satisfactory for stretch wrapping.

The inventors have made further researches in an attempt to overcome said various defects of the films comprising only the copolymer and also made researches on modifiers to be added to such films. For example, they studied various fatty acid amides which have been conventionally used in polyolefin resins in order to impart slip properties and anti-blocking properties to the films. As the results, they have found that oleic amide, and erucic amide are especially effective for EVA copolymer. Furthermore, in an attempt to impart to them antifog properties, they have made further researches on mixtures of various surfactants capable of imparting antifog properties to the films of EVA copolymer and said fatty acid amides. However, surfactants which can give antifog properties do not exhibit antifog properties in admixture with the fatty acid amides. The reason therefor is not clear. When a mixture of the surfactant with oleic amide is added, the resultant films wound into a roll form and preserved for a long period of time they cause the blocking phenomenon. On the other hand, when a mixture of the surfactant and erucic amide is added, erucic amide and the surfactant are separated and the erucic amide which coheres on the surface of the films produces white spot-like patterns to severely stain the surface. Moreover, these films are also reduced in tack strength and are not practically usable. As mentioned above, mere use of the known additives cannot attain the object of the present invention and the resultant films cannot be used as films for stretch wrapping.

The inventors have made researches on additives which improve the slip properties and the anti-blocking properties of the films of the EVA polymer and do not damage the antifog properties and tackiness of the film to find mixtures of polyalkylene ether polyols and non-ionic surfactants which are esters of fatty acids.

In the films of EVA copolymer into which a mixture of the polyalkylene ether polyol and the nonionic surfactant as specified in the present invention is incorporated, it is supposed that said mixture partially bleeds out to the surface layer and surface to form a thin layer on the surface. Thus, when the films are rolled up, blocking between the films is prevented and tackiness is also improved. In the case of said mixture being merely coated on the surface of the film, said effects cannot be obtained. Thus, it seems necessary that the mixture is present in the film in a suitable distribution of concentration in both inner and surface layers of the film.

It is considered that since said thin layer acts as a lubricating oil, the slip properties between the film surface and other goods is extremely improved without damaging other properties. The antifog properties of the non-ionic surfactants are not damaged at all as compared with said acid amides.

When the polyalkylene ether polyols are singly used, the films can have anti-blocking properties property, but have no tackiness and antifog properties and become whitish and are low in transparency.

The polyalkylene ether polyols used in the present invention are alkylene oxy alcohols having two or more hydroxyl groups in the molecular structure which are liquid having a boiling point of at least 200° C at 760 mmHg and a viscosity of lower than 1,000 cps at 23° C.

In order to melt and mix said compounds with EVA copolymer in a given amount, it is preferred that said compounds have a vapor pressure of less than atmospheric pressure at the melt extrusion temperature of said resin and furthermore having a boiling point of higher than 200° C under atmospheric pressure.

Polyalkylene ether polyols having a viscosity of higher than 1,000 cps at 23° C have a large molecular weight and are the so-called bulky molecules. It seems that such compounds diffuse and migrate in the film with difficult. Therefore, they do not bleed out to the surface of the film or require a very long time to bleed out to the surface. Thus, these films cannot be practically used. Even if the compounds bleed out to the surface, the surface become viscous and sticky due to their high viscosity and has low slip properties. Therefore, said compounds cannot be successfully used in the present invention.

On the other hand, polyalkylene ether polyols of low viscosity of lower than 1,000 cps have a small molecular weight and it is supposed that they rapidly bleed out from the inner part of the film to the surface thereof to form a semi-continuous or continuous liquid thin layer of low viscosity. Therefore, slip property and anti-blocking properties of the surface are markedly increased.

The viscosity of the compounds mentioned above is measured in accordance with the method as specified in ASTMD-1824-66.

Examples of the polyalkylene ether polyols used in the present invention are polyethylene glycol, polpropylene glycol, 1,4-butanediol, 1,5-pentadiol, ocytylene glycol, etc. Among them, polyethylene glycol and polypropylene glycol are preferred and especially, polyethylene glycol having a number average molecular weight of 200 – 1,000, especially 200 – 600 and polypropylene glycol having a number average molecular weight of 400 – 3,000 are more preferred. However, when only said compound, for example, polyethylene glycol having a number average molecular weight of 300 is added, as shown in Comparative Example 1, No. 27, the resultant film had a low kinetic coefficient of friction and a low force required for releasing a roller film and showed no change when the film was cured for 30 days. Thus, slip properties and anti-blocking properties were remarkably improved. However, tack strength of the film was considerably decreased, haze was increased, gloss was markedly lowered and the antifog properties was not improved at all. Furthermore, white spot-like stains caused by cohesion of said compound were formed on the surface of the film to render the appearance of the surface very bad. That is, said compound alone can extremely improve slip properties and anti-blocking property of the film, but cannot improve tackiness, transparency and antifog properties. Thus, films which are suitable for the object of the present invention cannot be obtained.

On the other hand, ordinarily used effective surfactants are used for preventing the inner surface of the film from fogging due to moisture and for inhibiting generation of static electricity in the wrapping of fresh foods. The non-ionic surfactants used in the present invention are at least one ester of a fatty acid and a polyhydric alcohol such as monoesters and/or diesters. Said non-ionic surfactants are required to have a high heat stability for being melt-mixed with said polymer and a certain degree of compatibility with said resin, to easily bleed out to the surface of film, to have a compatibility with said polyalkylene ether polyols, not to render the film sticky and to give antifog properties.

More specifically, examples of the nonionic surfactants used in the present invention are esters of polyhydric alcohols such as glycerine, polyglycerine, sorbitan, sorbitol, pentaerythritol, polyethylene glycol with straight chain saturated fatty acid having an alkyl group of 5—13 carbon atoms or with straight chain unsaturated fatty acid having an alkyl group which are 17–21 carbon atoms. Among them, those of liquid at normal conditions are preferred. Specific examples of said esters are fatty acid esters such as glycerine monooleate, diglycerine monooleate, diglycerine dioleate, diglycerine monolaurate, sorbitan monooleate, sorbitan monolaurte, sorbitan sesquioleate, erucic monoglyceride, caprylic monoglyceride, capric monoglyceride, lauric monoglyceride, etc. their polyethylene oxide ($n = 5 \sim 20$) addition products, polyoxyethylene glyceryl monooleate, etc. These are preferable because they provide sufficient antifog properties with addition of a small amount. On the other hand, fatty acid esters such as stearic esters and palmitic esters, especially glycerine esters thereof do not provide effective antifog properties to EVA copolymer with a single use. Moreover, polyoxyethylene ($n = 20$) glyceryl monostearate and polyoxyethylene ($n = 20$) sorbitan monooleate are not effective for providing antifog properties and even when the amount is increased to 1% by weight, the effect for providing antifog properties is small and the surface of the film is stained white.

Films of EVA copolymer to which only said non-ionic surfactants are added are excellent in transparency and antifog properties, but they have stickiness, namely, they are caught on every object with which they contact at wrapping and moreover they tend to requires an increase in force for releasing a rolled film with lapse of time.

For example, as shown in comparative examples given hereinafter, when only oleic monoglyceride was incorporated, antifog properties of the film were developed with addition of as low as about 0.3% of said compound and even when the content of the compound was increased to 1% by weight, no white stain of the surface of the film occurred. However, the film was poor in slip properties and tackiness and was sticky. Therefore, the film was caught on the fingers, on the meat tray of high impact polystyrene, on the feed roll of the wrapping machine, etc. in hand wrapping and it was difficult to wrap without creases and sags. In the case of using an automatic wrapping machine, also the film was caught on various rollers with which it contacted and wrapping was utterly impossible. Moreover, when the film was rolled immediately after production of the film and allowed to stand, the surfaces of the film were apt to cause blocking with each other. After a lapse of 10 days at 40° C, the force required for releasing the rolled film was higher than 10 g/cm and such film is outside the scope of the present invention.

When the amount of the non-ionic surfactant is increased, the surface of the film becomes sticky and is stained. Thus, it is impossible to impart both slip properties and tackiness to the film.

The inventors have made further researches on mixtures of said polyalkylene ether polyols and non-ionic surfactants in an attempt to overcome the defects of the films obtained with addition of either one of said polyalkylene ether polyols and non-ionic surfactants. As the result, it has been found that incorporation into the polymer of a specific amount of a mixture comprising said polyalkylene ether polyol and non-ionic surfactant in a specific proportion can attain remarkable synergistic effects that not only anti-blocking properties, transparency, gloss and antifog properties are not decreased, but also they are supplemented with each other; stickiness of the film is decreased to provide slip properties sufficient to wrap the goods; and takiness is increased.

That is, a mixture comprising (A) 10 - 40% by weight, preferably 15 - 35% by weight of at least one of said polyalkylene ether polyols and (B) 90 - 60% by weight, preferably 85 - 65% by weight of at least one of said non-ionic surfactants is mixed in an amount of 0.3 - 2% by weight, preferably 0.5 - 1.5% by weight with the polymer mentioned hereinbefore.

When the amount of said polyalkylene ether polyols is less than 10% by weight in the mixture, sufficient effects cannot be obtained with reference to anti-blocking properties, namely, releasability of the rolled film and stickiness, namely, slip properties. On the other hand, when the amount is more than 40% by weight, tackiness is markedly decreased and in the case of polyethylene glycol, the two additives are separated from each other and either one of them coheres on the surface of the resultant film to form white spot-like stains.

When the amount of the non-ionic surfactant is less than 60% by weight, sufficient antifog properties cannot be developed and when more than 90% by weight, kinetic coefficient of friction is increased and releasability of a rolled film becomes bad.

When the amount of said mixture is less than 0.3% by weight, characteristics of the compositions of the present invention cannot sufficiently be exhibited and when more than 2% by weight, the amount of said mixture which bleeds out from the interior of the film to the surface becomes extremely large to result in remarkable reduction in tackiness and extreme viscousness of the surface of the film.

Figure 2:
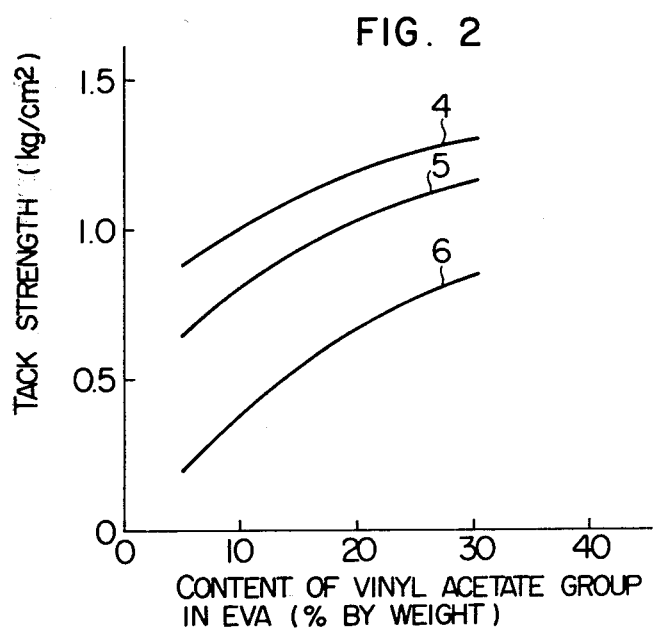

FIGS. 1 and 2 are graphs which show relations between the content of vinyl acetate groups in EVA copolymer and kinetic coefficient of friction and tack strength. Curve 1 in FIG. 1 and curve 6 in FIG. 2 indicate films of only the EVA copolymers which were obtained by the method of Comparative Example 3 given hereinafter. Curve 2 in FIG. 1 and curve 5 in FIG. 2 indicate films of only the EVA copolymers which were obtained by the method of Example 1. Curve 3 in FIG. 1 and curve 4 in FIG. 2 indicate the films of No. 2 to No. 7 of Example 1.

FIG. 3 is a graph which shows tensile characteristics of various films in TD, wherein curve 7 indicates the film of Comparative Example 3, curve 8 indicates film No. 3 in Example 1, curve 9 indicates film No. 25 in Example 4 and curve 10 indicates a commercially available cross-linked and oriented film of 16 $\mu$ in thickness for shrink wrapping.

CHARACTERISTICS OF THE FILMS OF THE PRESENT INVENTION

The present invention relates to a film for stretch wrapping which comprises said polymer and additives (A) and (B) and which has a kinetic coefficient of friction of 0.1 to 0.5, a tack strength of 0.4 to 1.5 Kg/cm$^2$, a haze of less than 5%, a heat shrinkage of 30 to 80% and an elastic recovery of more than 60% and is excellent in antifog properties.

I KINETIC COEFFICIENT OF FRICTION (SLIP PROPERTIES)

The kinetic coefficient of friction in the present invention is measured in accordance with ASTM D1894-63. Films having a kinetic coefficient of friction of more than 0.5 have a poor slip property against trays to be wrapped, roll portions and various parts of wrapping machines and hands to damage continuous wrapping ability. Furthermore, such film is caught on edges of the tray to cause breakage of the film or to result in insufficiently smoothed creases of the film. As the result, the wrapping state becomes poor. On the other hand, when the kinetic coefficient of friction is less than 0.1, other properties, especially tackiness of the film is abruptly decreased and especially when wrapping is carried out using an automatic wrapping machine, the film is too slippery to conveniently wrap the goods.

The kinetic coefficient of friction of the film is preferably 0.1 to 0.45.

In the case of using the polymer of the present invention as the basic component, the film of the present invention exhibits excellent properties as shown in FIG. 1, curve 3 without damaging other properties when the kinetic coefficient of friction is within the proper range. That said fact is due to the synergistic effect of using said copolymer and said additives and stretching by the method as explained hereinafter in such a manner that heat shrinkage is within the range of 30% to 80% will be clear by comparison of curve 1 in FIG. 1 (film having a heat shrinkage of less than 30% and containing no additives used in the present invention), curve 2 (film having a heat shrinkage of more than 30% and containing no additives used in the present invention) and curve 3 which indicates the film of the present invention.

II. TACK STRENGTH

Two sample films 10 mm in width which are backed with adhesive tape are allowed to contact with each other by pressing so that 3 cm$^2$ of the surfaces of the two films adhere to each other and these two films are pulled by a tensile testing machine at a rate of 200 mm/min. The tack strength is obtained by dividing the load required for releasing the films by the area. Film of less than 0.40 Kg/cm$^2$ in tack strength cannot stand the elastic recovery force of the film at wrapping and the wrapping film is immediately peeled off and the wrapping cannot be fixed. Thus, such film does not meet the requirements of films for stretch wrapping intended by the present invention. When the tack strength of the film is more than 1.5 Kg/cm$^2$, the slip property of the film is liable to decrease. Thus, the tack strength is preferably 0.5 to 1.5 Kg/cm$^2$.

It has been found that a film which comprises only EVA copolymer of the present invention and which is processed to provide a heat shrinkage of 30% to 80% is further improved in tack strength than a film having a heat shrinkage of less than 30%. In FIG. 2, curve 6 indicates the film containing no additives and being processed under conditions outside that of the present invention, curve 5 indicates the film containing no additives, but being processed under the conditions of the present invention and curve 4 indicates the film of the present invention containing the additives of the present invention.

III. HAZE

This value is obtained in accordance with ASTM D1003-61 and shows transparency of a film. The smaller this value is, the better the transparency is. When the haze is more than 5%, transparency of the film decreases and when the goods are wrapped with such film, clear-seeing of the wrapped goods which is one of the important characteristics of stretch wrapping is lost. This is not desired from the point of commercial value. Thus, this value is preferably less than 4%, more preferably less than 3%. In the present invention, as explained hereinafter, when a film having the composition as specified in the present invention is processed, unstretched raw tubing film quenched, for example, by water is stretched and oriented in a specific ratio under specific conditions while maintaining the transparency which is one of the present characteristics. Only by such procedure, the films of the present invention which also possess other requirements and are excellent in haze can be obtained.

IV. SPECULAR GLOSS

The films of the present invention are excellent in specular gloss and have a specular gloss of at least 50, preferably at least 60 which is measured in accordance with ASTM-D2454-65T. This is one of the important properties for improvement in commercial value of the wrapped goods.

V. ANTIFOG PROPERTY

Antifog property is necessary for preventing reduction of commercial value caused when the surface of the film is fogged and becomes opaque and the wrapped goods cannot be clearly seen due to water droplets in the case of the goods containing moisture or the goods being preserved at a low temperature. This is measured as follows: A 200 ml beaker which contains 100 ml of water at 20° C is covered with a film and this is allowed to stand in a thermostatic chamber set at 5° C. for 10 minutes. Then, this is taken out from the chamber and the degree of adhering of water droplets on the surface of the film is evaluated by the naked eye in accordance with the following standards. The excellent haze in the present invention means the degree of (Δ) or higher and preferably the degree (o).

(o): No water droplets are present on the surface and water is in a uniform layer.

(Δ): Large water droplets locally adhere or there is unevenness in the state of adhering water droplets.

(x): Fine water droplets adhere to whole surface and this is outside the present invention.

VI. FORCE REQUIRED FOR RELEASING A ROLLED FILM.

The films of the present invention are preferably low in said force. For example, a film is wound into a roll form and stored storaged and thereafter the film is used depending on the purpose. In this case, if blocking occurs between the surfaces of the film, there are problems in storage at a relatively high temperature for a long period of time, especially in the core part of continuous long film roll. That is, when the blocking phenomenon is great, the film is not released into one sheet of film, but is broken. Furthermore, when the film is drawn in an attempt to release into one sheet of film, the film is elongated to cause deformation or whitening. Further, the film cannot be easily drawn out and hence continuous wrapping by automatic wrapping machines is impossible. The films of the present invention which require tackiness, elasticity and elongation must be sufficiently low in the force required for releasing a rolled film. This is measured by the following method. That is, a film of 100 m wound into a roll form at a winding tension of 50 g/cm (per width of the film) is allowed to stand at 23° C and 50% relative humidity for 72 hours and then the force required for drawing out the film at a speed of 60 cm/min is measured and is expressed per unit width (cm) of the film.

In the present invention, a force of less than 7 g/cm, preferably less than 6 g/cm is desired for giving no adverse effects such as crease and deformation on the film and for efficiently conducting the wrapping.

VII. HEAT SHRINKAGE

The films of the present invention must be oriented and the orientation must be set until the heat shrinkage reaches 30%. The upper limit is 80%. The heat shrinkage is measured in accordance with ASTM D-1204-54 as explained below. A heat shrinkage of at least 30% means that the value is at least 30% even in the direction at which the shrinkage is the smallest. The direction of the smallest shrinkage is usually the direction of travelling of the film (referred to as "MD" hereinafter) or the direction perpendicular to the travelling direction (referred to as "TD" hereinafter). The heat shrinkage is measured in the following manner. A square test piece 100 mm on one side is cut out from the sample and, for example, talc powders are allowed to adhere to both surfaces of the test piece to prevent the test piece from receiving a restraining force caused by sticking to other materials while shrinking. Thereafter, the test piece is introduced into an air bath at 130° C for 5 minutes. Then, distance L (mm) between the opposite sides is measured and the heat shrinkage is calculated from the following formula.

$$\text{Heat shrinkage} = \frac{100 - L}{100} \times 100 \, (\%)$$

Generally, one side of the test piece is taken parallel to MD and other side perpendicular to said side is taken parallel to TD and heat shrinkages in both directions MD and TD are obtained.

Films of more than 30% heat shrinkage have the tendency of extremely increasing the increment of stress with increase in the strain in relation of stress and strain at tensile test as compared with films of less than 30% heat shrinkage. This fact can be explained with reference to FIG. 3 as follows: In FIG. 3, curves 8 and 9 are stress-strain curves of the films having a heat shrinkage of more than 30% and curve 7 is that of the film having a heat shrinkage of the less than 30%. It is one of essential requirements for uniformly stretching the stretch wrapping film without forming creases that the film has the stress-strain curve as shown by solid lines 8 and 9 in FIG. 3. That is, in the course of the film being stretched, when a part of the film begins to be stretched, stress per a certain amount of stretching which is required for further stretching said part gradually increases and another part further begins to be stretched and finally the whole film is nearly uniformly stretched without forming creases.

On the other hand, in the case of the film having the stress-strain curve shown by 7 in FIG. 3, the film can be stretched with nearly no increase in stress when stretching exceeds the yield point which appears at the beginning of stretching and at which the inclination of the curve abruptly changes. Therefore, the necking phenomenon occurs, namely, only one part is greatly stretched. As the result of partial stretching of the film, unevenness occurs in transparency and gloss and creases remain in the non-stretched part to result in extremely poor appearance. Such film cannot be practially utilized.

For example, when stretch wrapping is carried out by an automatic wrapping machine, the length to be stretched is fixed and no additional stretching can be made to eliminate creases, etc. to improve the final wrapping finish. In the case of hand wrapping, if additional stretching is carried out to improve the finish, the film is broken or when the stretched edge of the film is set at the back side of the goods, the film becomes bulky. As mentioned above, it is a requirement for the films of the present invention that the necking phenomenon should not occur. When the heat shrinkage of the film exceeds the upper limit of 80%, orientation becomes excessive to cause reduction in ultimate elongation and elasticity (stretchability).

VIII. ULTIMATE ELONGATION

This value is at least 200%, preferably at least 250%. This value expresses the amount of elongation necessary for fitting the film to goods of odd patterns by stretching. When the value is less than 200%, the finish of the wrapping is not good.

IX. ULTIMATE STRENGTH

Ultimate strength of the present films is 0.5 to 5 Kg/mm$^2$, preferably 1 to 4 Kg/mm$^2$. When it is less than 0.5 Kg/mm$^2$, the film is weak and easily broken and it is impossible to give sufficient tension to the whole wrapped goods. On the other hand, when it is more than 5 Kg/mm$^2$, excessive force is applied to the goods to be wrapped when the film is stretched for wrapping and as the result, the goods to be wrapped are broken or too much force is partially applied in stretching of the film to cause breakage of the film or it becomes impossible to stretch the film in hand wrapping or it becomes impossible to conduct continuous wrapping.

X. STRESS AT 200% ELONGATION

For the same reasons as in said (IX), this value is expressed by the range of stress at elongation of 200% per unit width (cm) of the film. This value is 100 to 500 g/cm, preferably 150 to 400 g/cm in both directions MD and TD. This value is measured at a tensile speed of 200 mm/min in accordance with ASTM D882-67. In FIG. 3, curve 7 indicates the sample of comparative Example 3 having a heat shrinkage of 16%, curve 8 indicates the sample of Example 1, No. 3 of the present invention which has a heat shrinkage of 51%, curve 9 indicates the sample of Example 4 No. 25 having a heat shrinkage of 66% and curve 10 indicates one example of a comparative film for shrink wrapping which is cross-linked and oriented and which has a thickness of 16 μ.

XI. DROP DART IMPACT STRENGTH

The films of the present invention must be excellent in drop dart impact strength and are required to have a drop dart impact strength of at least 10 kg·cm, preferably at least 15 Kg·cm and more preferably at least 20 Kg·cm. This value shows resistance to breakage by piercing. When it is less than 10 Kg·cm, the film tends to be broken by handling at or after wrapping. The drop dart impact strength is measured in accordance with ASTM D1709-67(A).

XII. ELASTIC RECOVERY

Furthermore, the films of the present invention must have an elastic recovery of more than 60%, preferably more than 70%. The elastic recovery herein used is measured in the following manner in accordance with ASTM D412-68T. An elastic recovery of more than 60% means that the elastic recovery in the direction of the smallest elastic recovery is more than 60%. The direction of the smallest elastic recovery is usually MD or TD. The elastic recovery is measured in the following manner. A test piece 10 mm in width and 100 mm in length is cut out from a film and gauge marks are given at the positions of 25 mm distant from center toward both ends. This test piece is pulled at a speed of 200 mm/min by a tensile test machine usually used for measuring tensile strength of plastics until the distance between the gauge marks becomes 100 mm and then it is maintained at that state for one minute. Then, the test piece is relaxed at the same speed as mentioned above until the tension stress applied to the test piece becomes zero and immediately thereafter it is taken out from the tensile test machine. Then, the test piece is allowed to stand for 60 minutes and the distance L (mm) between the two gauge marks is measured. The elastic recovery is calculated from the following formula:

$$\text{Elastic recovery} = \frac{100 - L}{50} \times 100 \, (\%)$$

When the elastic recovery is less than 60%, sufficient tension can be maintained with difficulty in stretch wrapping. The stretch wrapping requires a wrapping state where the film well fits the goods of various shapes and sizes without forming creases. For this purpose, the film must have a great elastic recovery and the film must recover to the original state and leave no creases against partial great elongation or reduction in the force after great elongation. Thus, the film is required to have an elastic recovery of at least 60%. When the elastic recovery of the film is less than 60%, uniform tension of the film cannot be obtained in stretch wrapping and in an extreme case creases are formed and wrapping cannot be accomplished. Furthermore, more than 60% of elastic recovery becomes necessary when the goods wrapped by the stretch wrapping method are piled up in several stages for temporary storage and when customers touch the film with fingers for testing the quality of the goods displayed in the show window. In this case, a force perpendicular to the surface of the film is applied to the uniformly stretched film and the surface of the film is deformed to produce creases. In the case of a film having an elastic recovery of more than 60%, creases disappear immediately when the force is removed while in the case of a film having an elastic recovery of less than 60%, once produced creases hardly disappear even when the force is removed and commercial value is greatly damaged. This value is preferably more than 70%.

XIII. THICKNESS

The use of the films of the present invention is for stretch wrapping. Therefore, a certain thickness is required. Thickness of the present films is preferably 10 to 30 $\mu$, more preferably 10 to 25 $\mu$. When the thickness is less than 10 $\mu$, the film when stretched is easily broken when it contacts with projections of the goods or tray and furthermore creases are apt to be produced while passing through the roll portion of the wrapping machine to damage the appearance of the goods. When the thickness is more than 30 $\mu$, a large force is applied when the film is stretched and excessive force is also applied to the goods or tray to rupture them. In the case of hand wrapping, a greater force is required or the back side of the goods or tray becomes bulky and longer time is required for heat sealing, thereby to cause breakage of other portions due to the heat. Furthermore, wrapping operability and economy are also extremely damaged.

The films of the present invention have the above mentioned fundamental characteristics and have the following additional merits as compared with the PVC films which have been used in practice.

Most of the goods to be stretch wrapped are vegetables and fruits and various meats and freshness thereof has great influence on determination of their commercial value. Factors which greatly influence the freshness of the stretch wrapped goods are oxygen permeability and water vapor permeability of the film. Generally, the smaller the values are, the better the effect is. The values of the films of the present invention are both smaller than those of the PVC films. Thus, the films of the present invention are the most suitable as films for stretch wrapping.

In stretch wrapping, a film is stretched to give a tension thereto, which is fixed by tackiness between the film per se or between the film and other materials. In the case of wrapping the goods placed in a tray, simple heat adhesion between films or between the film and the tray is conducted to make the fixing firmer. In such case, the films of the present invention can be easily heat sealed at 80° C to 100° C while the PVC film is hardly sealed by wrapping and can be firstly sealed at 180° to 200° C. This fact not only means that the time required for heat sealing is shortened, but also has an important meaning in that loosening of the wrapping caused by release of the film due to moisture adhering to the surface or evaporated from the goods when the wrapped goods are displayed in a show case or preserved in an icebox and losing the commercial value are prevented.

Furthermore, the goods such as vegetables, fruits or meats wrapped by stretch wrapping are preserved in a cold show case kept at lower than 10° C to keep freshness. Especially, most of the meats are preserved at about 0° C. Furthermore, frozen goods such as fishes and shells are sometimes kept at lower than −17° C. At such low temperature, PVC films lose softness and are easily broken by slight external force. On the other hand, since the films of the present invention comprise polyolefin polymer, especially EVA copolymer, the brittle temperature is lower than −70° C and the softness at the temperature of the usual show case is substantially the same as the softness at normal temperature.

Furthermore, the characteristics of the films of the present invention are stable against temperature. PVC films become sticky when room temperature is elevated, especially when it reaches 30° C in summer and cannot be used for automatic wrapping unless the room is cooled while the films of the present invention are not damaged at all in practical use.

The method for production of the films for stretch wrapping of the present invention will be explained below.

The method for producing the films of the present invention is characterized in that a composition comprising a polyolefin, especially an EVA copolymer as a basic component and (A) at least one polyalkylene ether polyol and (B) at least one non-ionic surfactant of a fatty acid and polyhydric alcohol ester derivative is melt extruded from an annular die and is quenched and solidified to obtain a raw tubular film, which is reheated to 70° to 150° C and the film is stretched by the inflation method so that the area stretching ratio becomes 10 to 50 times and the stretching ratio in the transverse direction becomes 3 to 9 times. That is, 10 to 40% by weight of (A) at least one polyalkylene ether polyol having a boiling point of at least 200° C under atmospheric pressure and a viscosity of 1,000 cps or lower at 23° C and 90 to 60% by weight of (B) at least one non-ionic surfactant of an ester of a fatty acid and a polyhydric alcohol are well milled and dispersed in an olefin polymer, preferably an EVA copolymer by a Banbury mixer to obtain a masterbatch or the components (A) and (B) are poured by injection pump from a liquid inlet provided at a cylinder wall in the course of melt extrusion of said polymer by an extruder, whereby extrusion and milling are simultaneously carried out. By these procedures, 0.3 to 2% by weight of (A) and (B) are contained in the polymer. The resultant mixed composition is extruded from annular die at 140 to 250° C. The external circumference of the thus extruded raw tubular film is cooled by a liquid to quench and solidify said tubular film to obtain a primary film.

The specific EVA copolymer used in the present invention is one having a melt index of 0.5 to 15 and containing 5 to 30% by weight of vinyl acetate groups. The reasons for limitations on the characteristics of the EVA copolymer have already been mentioned before and the films of the present invention are obtained by the above method and the copolymer must possess the necessary and sufficient stretchability at melting. A copolymer having a melt index of less than 0.5 and a vinyl acetate group content of less than 5% is inferior in stretchability at melting and the melted tubular film extruded from the die cannot be stretched and is broken. Thus, a tubular film cannot be obtained. On the other hand, a copolymer having a melt index of more than 15 and a vinyl acetate group content of more than 30% by weight has a low viscosity at melting and is extremely drawn down. Thus, also raw tubular film cannot be produced.

The temperature of the composition extruded from the die is preferably 140° to 250° C. When lower than 140° C, stretchability at melting is low and it is difficult to produce a raw tubular film. Moreover, the optical properties of the raw tubing film, the obtained especially haze and gloss are lowered because the surface is roughened. As a result, characteristics of the film subjected to later stretching process are deteriorated. When higher than 250° C, gelation of the polymer is promoted and decomposition and escape of the additives occur.

Furthermore, the raw tubular film extruded from an annular die under said conditions may be blown with the gas to inflate to a desired diameter and increase stability of the inflated raw tubular film between the die and nip roll. However, if the tubular film is completely solidified before cooling with a liquid, the effect of the liquid cooling cannot be expected at all as explained hereinafter and the haze becomes great and the gloss becomes small.

To cool and solidify the raw tubular film with a liquid which surrounds the external circumference of the tubular film is one of the important characteristics for obtaining the films of the present invention. The state that a liquid surrounds the external circumference of the tubular film means such a state as the tubular film passing through the liquid chamber and contacting with the liquid or a liquid layer extending to the external circumference of the tubular film and thus the tubular film contacting with the liquid. In both cases, the liquid must contact with the external circumference of the raw tubular film without breaks and must surround the tubular film.

Usually, water is suitable as the liquid. The temperature of the liquid is determined depending on the temperature of the raw tubular film, thickness of the raw tubular film, take-off speed of the raw tubular film, etc., but is lower than the melting point or softening point of the polymer used because the purpose of using the liquid is to cool and solidify the raw tubular film.

Excellent optical characteristics, namely, excellent haze and gloss which are one of the objects of the present invention are obtained by subjecting the film formed by cooling the raw tubing film with liquid to a quenching process. This is because such quenching process makes it possible to rapidly cool and fix the smooth and transparent surface of the raw tubular film extruded from a annular die while retaining the smoothness without roughening the surface. If to solidification of the raw tubular film is accomplished only by air blowing in the case of a thick raw tubular film as well as with thin raw tubing film if desired, the cooling cannot be rapidly accomplished even by vigorous air blowing and a smooth surface cannot be obtained. Moreover, not only the stability of diameter is low, but also blocking occurs on the inner surface of the raw tubular film when it is stretched at the next step to damage the stable stretchability and efficiency in speed of processing. Thus, a film having satisfactory properties cannot be obtained.

The thus obtained raw tubular film, i.e., the raw tubular film which satisfies the requirements of the present invention is uniformly heated to a given temperature from its external circumference and then is inflated to a given diameter, suitably stretched in the longitudinal and transverse directions and cooled and solidified by uniform air-blowing from the direction of the circumference. Thereafter, the film is continuously nipped by a nip roll and taken up by a take-up apparatus.

The temperature to which the raw tubular film is heated for the subsequent stretching step is 70° to 150° C, preferably 80° to 140° C. This temperature is important regarding the stretching effect and is determined by the desired thickness of film, heat shrinkage which indicates the degree of orientation, optical characteristics and kind of EVA copolymer used which have a relation with the stretching ratio.

Although it is difficult to individually specify the stretching ratio for the reasons mentioned above, mechanical strength is decreased with increase in stretching temperature. When stretching is carried out at a low temperature, lower a stretching ratio may be employed than when the same orientation is made at high temperature. A film to which a high orientation is imparted cannot be stretched unless a great force is applied when the wrapping intended by the present invention is carried out. As a result, the goods to be wrapped are ruptured and the wrapping state becomes bad. Furthermore, the process stability is lowered and the guage variation is increased when wider products are desired and a large apparatus must be used. This is not economical.

Preferred stretching can be attained by an area stretching ratio of less than 50 times, preferably less than 40 times and a transverse stretching ratio of 3 to 9 times, preferably 4 to 7 times. The term "area stretching ratio" means [longitudinal stretching ratio (MD) x transverse stretching ratio (TD)]. It is one of the characteristics of the present films that the necking phenomenon is prevented at the wrapping operation by applying suitable orientation to the films. Additionally, longitudinal and transverse orientations must not be excessively unbalanced. For example, the films obtained by the T-die method as shown in Comparative Example 2 given hereinafter cause an extreme necking phenomenon at the wrapping operation. In one example, heat shrinkage which is one standard factor for the orientation was 70% in the longitudinal direction and −15% in the transverse direction which were unbalanced with each other. On the other hand, in case of the film obtained a single step of inflation-quenching as described hereinafter, the extreme necking phenomenon as set forth above does not occur, but when the stretching degree at the wrapping operation is increased, the necking phenomenon also occurs and the finish of the wrapped goods, namely, tension of the wrapping film becomes poor. Heat shrinkage of this film is 77% in longitudinal direction and 16% in the transverse direction. As mentioned above, it is a characteristic of the present films that they are processed in such a manner that they have a heat shrinkage of at least 30% in both (longitudinal and transverse) directions.

The film of the present invention is especially suitable for wrapping by automatic wrapping machines, but it also can be used for hand stretch wrapping and other autohesive wrappings.

The present invention will be illustrated in the following Examples which, however, are not to be construed as imposing any particular limitation thereon.

EXAMPLE 1

Each of the pellet-like masterbatches comprising EVA copolymer and additives as shown in Table 1 was extruded downward from an annular die 50 mm in diameter which was provided at the top of an extruder 45 mm in diameter and which had a slit of 0.5 mm under the following conditions: maximum temperature of cylinder part . . . 190° C; number of rotations of the screw . . . 55 rpm; temperature of die part . . . 180° C; temperature of the compositions withdrawn . . . 180° C. Then, the extruded product was inflated so that the ratio of diameter of the die and that of tubular film (blow up ratio) was 1.3. The resultant raw tubular film was cooled and solidified at the position which was about 20 cm distant from the top of the die by water having a temperature of 15° C which was flowed out at 4 l/min from a ring having inside thereof a slit from which water is flown out in such a manner that said water surrounded the tubular film. This raw tubular film was then taken up by a nip roll at a take-up speed of 4.5 m/min in such a manner that the lay flat was 100 mm and thickness was 220 μ. Thus, a raw film was obtained. At this time since composition No. 8 was drawn down from the die and stable raw tubular film could not be produced, the temperature of the die was lowered to 140° C and only at this temperature the film could be processed. In the case of composition No. 1, the temperature of die portion was raised to 210° C because the surface of the film was apt to be roughened at 180° C.

Each of the thus obtained raw tubular films was allowed to pass through a heating cylinder provided with a ring infrared heater to heat the film to the following respective given temperatures: compositions No. 1 to No. 7; 132°, 126°, 112°, 110°, 100°, 90°, and 95° C, respectively. Then, each of them was inflated to about 3.7 times the original diameter by blowing air thereinto and uniformly cooled with air by an air ring from the external circumference to obtain a film having a thickness of 18 μ and a lay flat of 37 cm. Then, this was taken up at a take-up speed of 15 m/min by a nip roll. The edge thereof was removed by slitting to obtain a film 30 cm in width, which was separated into two films and wound into a roll. In the case of composition No. 8, the draw-down phenomenon vigorously occurred and so the heating temperature was reduced to 90 to 80° C, but blocking between films occurred after heating and the film was easily broken and therefore the film could not be inflated by introducing air therein. In the case of composition No. 1, the inflated tubular film was unstable at stretching and it was difficult to produce a uniform film.

Table 1

| Composition No. | Melt index of copolymer | Content of vinyl acetate groups (% by weight) | Total amount of additives (% by weight) | Mixing ratio of additives (% by weight) | |
|---|---|---|---|---|---|
| | | | | A₁ | B₁ |
| 1 (control) | 0.3 | 4.2 | 0.7 | 30 | 70 |
| 2 | 2.2 | 5.9 | " | " | " |
| 3 | 1.7 | 10.2 | " | " | " |
| 4 | 3.4 | 15.0 | " | " | " |
| 5 | 2.8 | 19.2 | " | " | " |
| 6 | 4.2 | 28.9 | " | " | " |
| 7 | 9.0 | 25.0 | " | " | " |
| 8 (control) | 30 | 28.0 | " | " | " |

Note:
A₁ ... polyethylene glycol having a number average molecular weight of 300 (boiling point ... higher than 250° C and viscosity ... 70 cps).
B₁ ... diglycerine monooleate Characteristics of the thus obtained films are shown in Table 2. In Table 2, "(l) Wrapping yield" means as follows: 50 meat trays of high impact polystyrene, each of which contained about 200 g of meat were wrapped at a speed of 30 trays/min by automatic wrapping machine F (Dove Franklin 530 stretch wrapping machine manufactured by Fuji Wrapping Materials Co. Ltd.). The number of wrappings which had great creases of more than 20 mm length on the surface of the film and those which were not wrapped in a good state because of breakage of the film or upset of the tray during the wrapping operation were subtracted from the total number of wrappings. The percentage of the remaining good wrappings was the wrapping yield.

In Table 2, film No. 1 which was a comparative film was whitened in its surface and was inferior in optical characteristics, tackiness and elastic recovery. Furthermore, when said wrapping test was effected using this film, great creases were formed on the surface of the wrappings. Therefore, this film could not be practically used for stretch wrapping. Furthermore, wrapping was carried out with films No. 2 to No. 5 in Table 2 by automatic wrapping machine A (Automac 22 stretch wrapping machine manufactured by Fuji Kikai Kogyo Co. Ltd.). The same good results as those obtained by the automatic wrapping machine F were obtained while in the case of films No. 6 to No. 7 three and four wrappings were impossible in fifty wrappings, respectively.

Table 2

| No. | Items | Heat (a) shrinkage (%) | Elastic (b) recovery (%) | Stress at (c) 200 % elongation (gr/cm) | Ultimate (d) elongation (%) | (e) Specular gloss | (f) Haze (%) | Tack (g) strength (kg/cm²) |
|---|---|---|---|---|---|---|---|---|
| 1 (control) | MD | 67 | 58 | 310 | 350 | 45 | 10.1 | 0.3 |
| | TD | 35 | 48 | 145 | 480 | | | |
| 2 | MD | 60 | 78 | 260 | 370 | 70 | 4.5 | 0.9 |
| | TD | 45 | 73 | 165 | 350 | | | |
| 3 | MD | 65 | 80 | 285 | 400 | 85 | 2.8 | 1.0 |
| | TD | 51 | 78 | 185 | 450 | | | |
| 4 | MD | 61 | 83 | 200 | 360 | 89 | 2.5 | 1.1 |
| | TD | 42 | 80 | 165 | 430 | | | |
| 5 | MD | 50 | 89 | 220 | 420 | 90 | 1.8 | 1.2 |
| | TD | 48 | 86 | 130 | 480 | | | |
| 6 | MD | 65 | 90 | 155 | 410 | 97 | 1.4 | 1.3 |
| | TD | 45 | 87 | 105 | 450 | | | |
| 7 | MD | 63 | 92 | 140 | 480 | 96 | 1.7 | 1.2 |
| | TD | 40 | 86 | 110 | 520 | | | |
| 8 (control) | MD | ~ | ~ | ~ | ~ | ~ | ~ | ~ |
| | TD | | | | | | | |

| Kinetic (h) coefficient of friction | Drop dart (i) impact strength (kg.cm) | Force for (j) releasing rolled film (g/cm) | (k) Antifog property | (l) Wrapping yield (%) |
|---|---|---|---|---|
| 0.20 | 15 | 2.1 | o | — |
| 0.23 | 17 | 2.7 | o | 84 |
| 0.22 | 26 | 4.2 | o | 100 |
| 0.31 | 33 | 4.5 | o | 100 |
| 0.35 | 29 | 5.2 | o | 96 |
| 0.37 | 18 | 5.8 | o | 86 |
| 0.36 | 20 | 5.9 | o | 84 |
| ~ | ~ | ~ | ~ | ~ |

Note:
(a) ~(k) were measured in accordance with the methods mentioned in this specification.
(l) was mesured in accordane with the method mentioned hereinafter.
"MD" means longitudinal direction of film at processing and
"TD" means transverse direction.

EXAMPLE 2

To the EVA copolymer of No. 3 in Example 1 were added additives as shown in Table 3 and films were produced from these compositions under the same processing conditions as of No. 3 in Example 1 (except that the number of rotations of the screw was 65 rpm, thickness of the raw tubular film was 265 μ, thickness of the final film was 16 μ and lay flat of the film was 50 cm). Characteristics of the thus obtained films are shown in Table 4. The wrapping yield in Table 4 was determined in the same manner as in Example 1 using the automatic wrapping machine F, but substantially the same results were obtained by using the automatic wrapping machine A.

Table 3

| No. | Total amount of additives (% by weight) | Mixing ratio of additives (% by weight) | | | | | |
|---|---|---|---|---|---|---|---|
| | | $A_1$ | $A_2$ | $A_3$ | $B_1$ | $B_2$ | $B_3$ |
| 9 (control) | 0.2 | 15 | — | — | 85 | — | — |
| 10 | 0.3 | 15 | — | — | 85 | — | — |
| 11 | 0.5 | 15 | — | — | 85 | — | — |
| 12 | 0.7 | 30 | — | — | — | 70 | — |
| 13 | " | 30 | — | — | — | — | 70 |
| 14 | " | — | 30 | — | 70 | — | — |
| 15 | 0.7 | — | — | 30 | 70 | — | — |
| 16 | 1.5 | 30 | — | — | 70 | — | — |
| 17 (control) | 2.5 | 15 | — | — | 85 | — | — |

Note:
$A_2$ ... Polyethylene glycol having a number averge molecular weight of 600 (boiling point ... higher than 250° C and viscosity ... 140 cps)
$A_3$ ... Polypropylene glycol having a number average molecular weight of 400 (boiling point ... higher than 250° C and viscosity ... 70 cps)
$B_2$ ... Sorbitan monolaurate
$B_3$ ... Glycerine monooleate Table 4

| No. | Haze (%) | Tack strength (kg/cm²) | Kinetic coefficient of friction | Force for releasing rolled film (g/cm) | Antifog property | Wrapping yield (%) |
|---|---|---|---|---|---|---|
| 9 (control) | 3.4 | 0.8 | 0.61 | 19 | x | — |
| 10 | 3.2 | 1.1 | 0.35 | 5.8 | Δ | 90 |
| 11 | 3.0 | 1.1 | 0.33 | 5.3 | o | 92 |
| 12 | 3.1 | 1.2 | 0.27 | 4.0 | o | 100 |
| 13 | 3.2 | 1.3 | 0.30 | 3.5 | o | 100 |
| 14 | 3.3 | 1.1 | 0.29 | 3.2 | o | 100 |
| 15 | 3.3 | 0.9 | 0.31 | 3.9 | o | 100 |
| 16 | 3.2 | 0.8 | 0.34 | 3.0 | o | 94 |
| 17 (control) | 2.9 | 0.3 | 0.85 | 2.5 | o | — |

Since film No. 9 contained a small total amount of the additives, this film had no antifog properties and had a high kinetic coefficient of friction. Therefore, continuous wrapping could not be carried out with this film by an automatic wrapping machine. Furthermore, the blocking phenomenon was apt to occur.

In the case of film No. 17 which contained a large total amount of the additives the additives excessively bleed out to render the surface of the film sticky to cause clinging between film and roll of wrapping machine or between the films at the wrapping operation. As a result, travelling ability of the film was reduced and continuous wrapping was impossible.

Film No. 12 was subjected a wrapping test changing the environmental temperature from −10° C to 40° C and there were no problems in wrapping ability. Furthermore 1000 m of this film were wound into a roll, but there were no problems in the longitudinal direction of the film in continuous wrapping.

The No. 12 film had heat shrinkages of 68% in MD and 57% in TD, elastic recoveries of 88% in MD and 87% in TD, stresses at 200% elongation of 220 g/cm in MD and 180 g/cm in TD and ultimate elongations of 450% in MD and 470% in TD.

EXAMPLE 3

To the EVA copolymer of No. 3 in Example 1 were added the additives as enumerated in Table 5. These compositions were processed in the same manner as in Example 1 to obtain films 18 $\mu$ in thickness. The characteristics of these films are shown in Table 6. In Table 6, the wrapping yield was determined using automatic wrapping machine F.

Table 5

| No. | Total amount of additives (% by weight) | Mixing ratio of the additives (% by weight) | | | | |
|---|---|---|---|---|---|---|
| | | $A_1$ | $A_4$ | $B_1$ | $B_2$ | $B_4$ |
| 18 | 0.7 | 30 | — | 35 | 35 | — |
| 19 | 0.7 | 30 | — | 50 | — | 20 |
| 20 | 1.0 | — | 30 | 70 | — | — |
| 21 | 0.7 | 15 | 15 | 70 | — | — |

Note:
$A_4$ ... Polypropylene glycol having a number average molecular weight of 3000 (boiling point ... higher than 250° C and viscosity ... 650 cps)
$B_4$ ... Polyoxyethylene (n = 20) sorbitan monooleate Table 6

| No. | Haze (%) | Tack strength (kg/cm²) | Kinetic coefficient of friction | Force for releasing rolled film (g/cm) | Antifog property | Wrapping yield (%) |
|---|---|---|---|---|---|---|
| 18 | 2.8 | 1.0 | 0.25 | 4.3 | o | 100 |
| 19 | 3.4 | 0.9 | 0.24 | 4.0 | o | 96 |
| 20 | 2.3 | 1.1 | 0.34 | 4.7 | o | 84 |
| 21 | 2.6 | 0.9 | 0.27 | 4.5 | o | 92 |

EXAMPLE 4

Using the EVA copolymer and additives of No. 4 in Example 1, raw tubular films of 190 $\mu$, 240 $\mu$, 320 $\mu$ and 370 $\mu$ in thickness were produced in the same manner as in Example 1. These films were inflated to 3.5, 4.5, 6.0 and 7.0 times the original diameter and there were obtained four kinds of films having a thickness of 16 $\mu$. When the films were inflated to 12 times the original diameter, process stability was decreased and fixing of the inflation-starting point was difficult to cause surging of the film. Thus, uniform film could not be obtained.

Characteristics of the films obtained are shown in Table 7. Film No. 22 was obtained by inflation to 3.5 times, No. 23 was by 4.5 times, No. 24 was 6.0 times and No. 25 was 7.0 times. The wrapping yield was determined using the automatic wrapping machine F.

Table 7

| No. | | Heat shrinkage (%) | Elastic recovery (%) | Stress at 200 % elongation (g/cm) | Ultimate elongation (%) | Specular gloss | Haze (%) | Tack strength (kg/cm²) | Kinetic coefficient of friction |
|---|---|---|---|---|---|---|---|---|---|
| 22 | MD | 75 | 82 | 240 | 300 | 96 | 2.4 | 0.8 | 0.35 |
|    | TD | 37 | 78 | 145 | 490 | | | | |
| 23 | MD | 70 | 89 | 230 | 450 | 92 | 2.6 | 1.1 | 0.32 |
|    | TD | 50 | 88 | 170 | 530 | | | | |
| 24 | MD | 65 | 88 | 220 | 430 | 73 | 3.8 | 1.0 | 0.27 |
|    | TD | 60 | 87 | 210 | 360 | | | | |
| 25 | MD | 63 | 83 | 200 | 380 | 69 | 4.0 | 0.8 | 0.25 |
|    | TD | 66 | 85 | 240 | 330 | | | | |

| Drop dart impact strength (kg.cm) | Force for releasing rolled film (g/cm) | Wrapping yield (%) |
|---|---|---|
| 25 | 4.1 | 90 |
| 29 | 4.2 | 100 |
| 36 | 3.7 | 100 |
| 38 | 2.9 | 96 |

COMPARATIVE EXAMPLE 1

Using the EVA copolymer of No. 4 in Example 1 and additives as mentioned in Table 8, films 18 $\mu$ in thickness were obtained in the same manner as in Example 1. Characteristics of the films obtained are shown in Table 9. The wrapping yield was determined using the automatic wrapping machine F.

Table 8

| No. | Total amount of additives (% by weight) | Mixing ratio of additives (% by weight) | | | | |
|---|---|---|---|---|---|---|
| | | $A_1$ | $A_5$ | $B_2$ | $B_3$ | $B_4$ |
| 26 | — | — | — | — | — | — |
| 27 | 0.3 | 100 | — | — | — | — |
| 28 | 0.3 | — | 100 | — | — | — |
| 29 | 0.7 | — | 30 | 70 | — | — |
| 30 | 0.5 | — | — | — | 100 | — |
| 31 | 1.0 | — | — | — | 100 | — |
| 32 | 0.5 | — | — | — | — | 100 |
| 33 | 0.7 | — | — | 50 | 50 | — |
| 34 | 0.7 | — | — | — | 50 | 50 |
| 35 | 2.0 | — | — | — | 100 | — |

Note:
$A_5$ ... Erucic amide

Table 9

| No. | Haze (%) | Tack strength (kg/cm²) | Kinetic coefficient of friction | Force for releasing rolled film (g/cm) | Antifog property | Wrapping yield (%) |
|---|---|---|---|---|---|---|
| 26 | 2.5 | 0.9 | 0.87 | 24.0 | x | — |
| 27 | 7.2 | 0.3 | 0.29 | 2.8 | x | 10 |
| 28 | 13.2 | 0.4 | 0.21 | 5.6 | x | 8 |
| 29 | 11.4 | 0.3 | 0.35 | 3.9 | x | 6 |
| 30 | 2.4 | 0.9 | 0.80 | 4.6 | o | — |
| 31 | 2.4 | 0.5 | 0.85 | 4.3 | o | — |
| 32 | 2.8 | 0.6 | 0.81 | 3.4 | Δ | — |
| 33 | 2.2 | 0.6 | 0.74 | 3.7 | o | — |
| 34 | 3.1 | 0.7 | 0.79 | 3.5 | o | — |

Table 9-continued

| No. | Haze (%) | Tack strength (kg/cm²) | Kinetic coefficient of friction | Force for releasing rolled film (g/cm) | Antifog property | Wrapping yield (%) |
|---|---|---|---|---|---|---|
| 35 | 2.5 | 0.4 | 0.90 | 3.9 | o | — |

The blank film No. 26 had a high kinetic coefficient of friction and could not be used in a wrapping machine and had no practical use. Furthermore, this film had no antifog property and was apt to cause the blocking phenomenon of the film wound into a roll.

Films No. 27 to 29 were inferior in tack strength, haze and antifog property and the surface was stained white.

In the case of films No. 30 to 35, these films clung to the roll of the wrapping machine or blocking occurred between the films wound into roll form. As result, travelling ability of the films was low and stable continuous wrapping could not be accomplished. Especially, film No. 35 was conspicuous in the above defect.

COMPARATIVE EXAMPLE 2

The EVA copolymer and additives of No. 3 in Example 1 were extruded using a manifold type T die having a slit 0.4 mm in aperture and 35 cm in width provided in an extruder 45 mm in diameter with adjusting of the cylinder temperature and die temperature so that the temperature of the resin at the die exit was 180° C. The film extruded was fed to a water bath, where the film was cooled and solidified at 21° C to obtain a roll-like film having a thickness of 18 μ and a width of 30 cm. This film had unbalanced heat shrinkages of 70% in MD and −15% in TD. This film was oriented in only one direction and the necking phenomenon greatly occurred only by drawing in TD direction. Furthermore, this film had a low drop dart impact strength of 4.1 kg.cm and was broken with ease. Thus, this film was different from the films of the present invention.

COMPARATIVE EXAMPLE 3

The EVA copolymer and additives of No. 3 in Example 1 was extruded downward from an annular die 100 mm in diameter which was provided at the top of an extruder having a diameter of 45 mm and which had a slit of 0.4 mm under the following conditions: maximum temperature of cylinder part . . . 190° C; temperature of die part . . . 200° C. The film was inflated in such a manner that the ratio of diameter of the die and diameter of the raw tubular film (blow up ratio) 2.5. Air was blown to the film blown at 23° C and 0.7 m³/min from an air supplying apparatus having inside thereof a ring slit at the position about 3 cm distant from the top of the die. Thereafter, the raw tubular film was cooled and solidified at the position about 27 cm distant from the top of the die by contacting with service water having a temperature of 21° C which was flowed out from a liquid supplying apparatus having a ring slit therein at 8 l/min in such a manner that the water surrounded the raw tubular film. A raw tubular film 18 μ in thickness and 35 cm in lay flat was obtained by an extrusion rate of about 10 kg/Hr. This film had the following properties: Heat shrinkage . . . 77% in MD and 16% in TD; Elastic recovery . . . 62% in MD and 45% in TD; Ultimate strength . . . 2.1 kg/mm² in MD and 1.8 kg/mm² in TD; Ultimate elongation . . . 360% in MD and 780% in TD; Stress at 200% elongation . . . 230 g/cm in MD and 90 g/cm in TD; Specular gloss . . . 92; Haze . . . 2.6%; Tack strength . . . 0.49 kg/cm²; Drop Dart impact strength . . . 8.3 kg.cm; and Force for releasing rolled film . . . 3.2 g/cm. Furthermore, this film had good antifog properties.

This film was subjected to the same test as in Example 1 using the automatic wrapping machine F. The results are as follows: The film was not caught on any parts of the machine, but the necking phenomenon occurred on the surface and since this film was inferior to the present film in tack strength and elastic recovery, many creases were produced due to insufficient stretch force and loosening of the wrapping and moreover, much breakage of the film occurred due to insufficient strength (especially against piercing) at the wrapping operation.

Similar results were obtained by wrapping using a hand wrapper.

What is claimed is:

1. Films for stretch wrapping which comprise (1) 99.7-98% by weight of an ethylene-vinyl acetate copolymer having a melt index of 0.5-15 and containing 5-30% by weight of vinyl acetate and (2) 0.3-2% by weight of an additive, said additive comprising (A) 10-40% by weight of at least one polyalkylene ether polyol having a boiling point of at least 200° C. at 760 mm. Hg and a viscosity of less than 1,000 cps at 23° C. and (B) 90-60% by weight of at least one non-ionic surfactant which is an ester of a polyhydric alcohol with either a straight chain saturated fatty acid having an alkyl group of 5 to 13 carbon atoms or a straight chain unsaturated fatty acid having an alkyl group of 17 to 21 carbon atoms, said films having a kinetic coefficient of friction of 0.1-0.5, a tack strength of 0.4-1.5 kg/cm², a haze of less than 5%, a heat shrinkage of 30-80% and an elastic recovery of at least 60%.

2. Films according to claim 1, wherein the mixing ratio of aditives is 15-35% by weight of (A) and 85-65% by weight of (B).

3. Films according to claim 1, wherein the total amount of the additives (A) and (B) is 0.5-1.5% by weight.

4. Films according to claim 1, wherein the ethylene-vinyl acetate copolymer has a melt index of 1 to 10 and a vinyl acetate group content of 5 to 20% by weight.

5. Films according to claim 1, wherein the polyalkylene ether polyol (A) is polyethylene glycol having a number average molecular weight of 200 to 600.

6. Films according to claim 1, wherein the polyalkylene ether polyol (A) is polypropylene glycol having a number average molecular weight of 400 to 3000.

7. Films according to claim 1, wherein the ester is monoester, diester or mixed mono- and di-ester of a fatty acid selected from lauric acid, oleic acid, and erucic acid and a polyhydric alcohol selected from glycerine, polyglycerine, sorbitan, sorbitol and pentaerythritol.

8. Films according to claim 1, wherein the non-ionic surfactant (B) a polyoxyethylene addition product.

9. Films according to claim 1, which have a thickness of 10 to 30 μ.

10. Films according to claim 1, which have a kinetic coefficient of friction of 0.1 to 0.45.

11. Films according to claim 1, which have a tack strength of 0.5 to 1.5 kg/cm².

12. Films according to claim 1, which have an elastic recovery of at least 70%.

13. Films according to claim 1, which have an ultimate elongation of at least 200% and a stress at 200% elongation of 100 to 500 g/cm.

14. Films according to claim 1, which have a drop dart impact strength of at least 10 kg.cm.

* * * * *